United States Patent
Meffert et al.

(10) Patent No.: US 7,185,614 B2
(45) Date of Patent: Mar. 6, 2007

(54) DOUBLE BOWL PISTON

(75) Inventors: Darrel Henry Meffert, Sparland, IL (US); Roger Leroy Urven, Jr., Colona, IL (US); Cory Andrew Brown, Pekin, IL (US); Mark Harold Runge, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/975,101

(22) Filed: Oct. 28, 2004

(65) Prior Publication Data
US 2006/0090726 A1    May 4, 2006

(51) Int. Cl.
*F02F 3/26* (2006.01)
*F02P 1/04* (2006.01)

(52) U.S. Cl. .................... 123/41.35; 123/269; 123/276
(58) Field of Classification Search .............. 123/269, 123/276, 279, 299, 285, 41.35, 193.6
See application file for complete search history.

(56) References Cited

U.S. PATENT DOCUMENTS

| | | | |
|---|---|---|---|
| 5,617,823 A * | 4/1997 | Gray et al. ................. 123/254 |
| 6,152,101 A | 11/2000 | Parsi | |
| 6,314,933 B1 * | 11/2001 | Iijima et al. .............. 123/193.6 |
| 6,539,910 B1 * | 4/2003 | Gaiser et al. ............ 123/193.6 |
| 6,701,875 B2 * | 3/2004 | Weng et al. .............. 123/41.35 |
| 6,708,666 B2 | 3/2004 | Roberts, Jr. | |
| 6,739,309 B2 * | 5/2004 | Hiraya et al. ............... 123/279 |
| 6,799,550 B2 * | 10/2004 | Wirth ......................... 123/276 |
| 2004/0123832 A1 * | 7/2004 | Quigley et al. ............. 123/276 |
| 2005/0115537 A1 * | 6/2005 | Liu | |
| 2005/0115538 A1 * | 6/2005 | Ono et al. .................. 123/276 |

* cited by examiner

*Primary Examiner*—Hai Huynh
(74) *Attorney, Agent, or Firm*—Finnegan, Henderson, Farabow, Garrett & Dunner

(57) ABSTRACT

A piston for an internal combustion engine is disclosed. The piston has a piston crown with a face having an interior annular edge. The piston also has first piston bowl recessed within the face of the piston crown. The first piston bowl has a bottom surface and an outer wall. A line extending from the interior annular edge of the face and tangent with the outer wall forms an interior angle greater than 90 degrees with the face of the piston. The piston also has a second piston bowl that is centrally located and has an upper edge located below a face of the piston crown.

44 Claims, 2 Drawing Sheets

DOUBLE BOWL PISTON

U.S. GOVERNMENT RIGHTS

This invention was made with government support under the terms of Contract No. DE-FC05-97OR22605 awarded by the Department of Energy. The government may have certain rights in this invention.

TECHNICAL FIELD

The present disclosure relates generally to a piston and, more particularly, to a piston having double bowl geometry.

BACKGROUND

Engines, including diesel engines, gasoline engines, natural gas engines, and other engines known in the art, may exhaust a complex mixture of air pollutants. The air pollutants may be composed of gaseous compounds, which may include nitrogen oxides, and solid particulate matter, which may include unburned hydrocarbon particulates called soot.

Due to increased attention on the environment, exhaust emission standards have become more stringent. The amount of air pollutants emitted from an engine may be regulated depending on the type of engine, size of engine, and/or class of engine. One method that has been implemented by engine manufacturers to comply with the regulation of particulate matter exhausted to the environment has been to develop new engines, which enhance swirl and air/fuel mixing while allowing for late fuel injections near top-dead-center (TDC).

One method of enhancing swirl is described in U.S. Pat. No. 6,152,101 (the '101 patent), issued to Parsi et al. on Nov. 28, 2000. The '101 patent describes a piston for an internal combustion engine, which has the capability of producing high gas velocities within a combustion chamber over a critical period of engine cycle near TDC. Specifically, the piston of the '101 patent has a combustion bowl with a first volume in communication with a second volume. The smallest diameter of a throat portion connecting the first and second volumes is smaller than the greatest diameter of the first volume and is smaller than the greatest diameter of the second volume. The greatest diameter of the first volume is greater than the diameter of a mouth of the combustion bowl. A wall means defining the first volume with respect to a piston crown face is less than 90 degrees.

Although the piston of the '101 patent may produce high gas velocities near TDC, it does not fully utilize a space above a face of the piston crown for swirling or mixing. In particular, because both the mouth and throat portion of the '101 patent have diameters less than diameters of the first and second volumes and because the wall means forms an angle that is less than 90 degrees with respect to the piston crown face, nearly all of the fuel injected into either of the first and second volumes is redirected radially inward toward a central portion of the piston rather than into the space above the face of the piston crown. Further, because the internal geometries of the first and second volumes have nearly identical contours, the direction of swirl within the piston cylinder caused by the first and second volumes may be limited. In addition, the piston of the '101 patent does not provide for a way to cool the piston.

The disclosed piston is directed to overcoming one or more of the problems set forth above.

SUMMARY OF THE INVENTION

In one aspect, the present disclosure is directed to a piston for an internal combustion engine. The piston includes a piston crown having a face with an interior annular edge. The piston also includes a first piston bowl is recessed within the face of the piston crown. The first piston bowl has a bottom surface and an outer wall. A line extending from the interior annular edge of the face of the piston and tangent with the outer wall forms an interior angle greater than 90 degrees with the face of the piston crown. The piston further includes a second piston bowl centrally located and having an upper edge located below the face of the piston crown.

In another aspect, the present disclosure is directed to a method of operating an internal combustion engine having at least one cylinder and a piston slidably disposed within the at least one cylinder. The method includes moving a piston toward a top dead center position during a compression stroke and injecting fuel into a first piston bowl. The first piston bowl is recessed within a face of the piston. The first piston bowl has a bottom surface and an outer annular wall. A line extending from an interior annular edge of the face of the piston and tangent with the outer annular wall forms an interior angle greater than 90 degrees with the face of the piston. The method also includes injecting fuel into a second piston bowl that is centrally located and has an upper edge located below a face of the piston crown.

DETAILED DESCRIPTION

Figure 1:
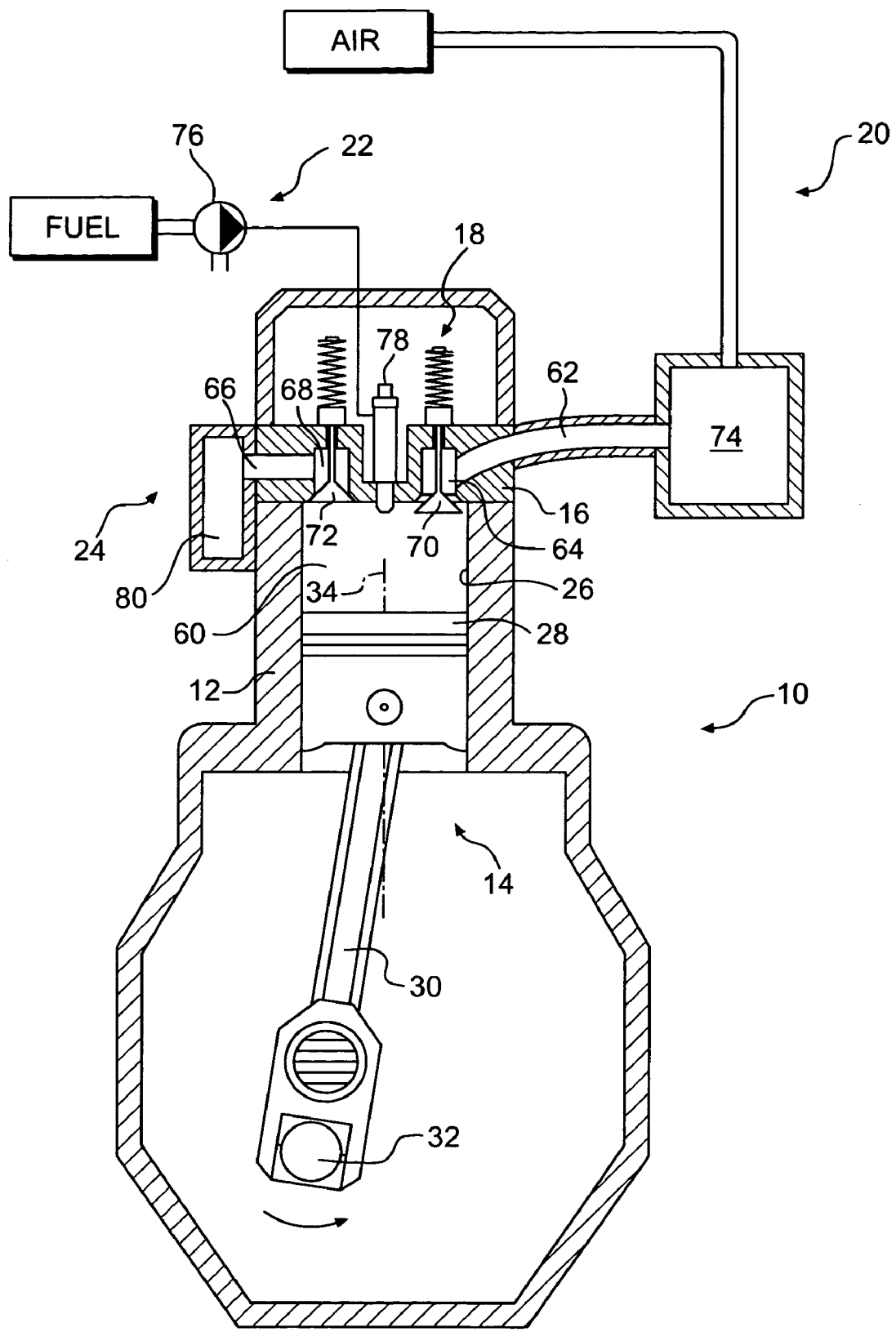
FIG. 1 is a diagrammatic and schematic illustration of an exemplary disclosed internal combustion engine.

An exemplary internal combustion engine 10 is illustrated in FIG. 1. Internal combustion engine 10 is depicted and described as a diesel engine. However, it is contemplated that internal combustion engine 10 may be any other type of internal combustion engine, such as, for example, a gasoline or natural gas engine. Internal combustion engine 10 may include an engine block 12, a plurality of piston assemblies 14 (only one shown), a cylinder head 16 associated with each piston assembly 14, a valve actuation system 18, an air induction system 20, a fuel system 22, and an exhaust system 24.

Engine block 12 may be a central structural member defining a plurality of cylinders 26 (only one shown). One of piston assemblies 14 may be slidably disposed within each of cylinders 26. It is contemplated that the internal combustion engine 10 may include any number of cylinders 26 and that the cylinders 26 may be disposed in an "in-line" configuration, a "V" configuration, or any other conventional configuration.

Each piston assembly 14 may be configured to reciprocate between a bottom-dead-center (BDC) position, or lower-most position within cylinder 26, and a top-dead-center (TDC) position, or upper-most position within cylinder 26. In particular, piston assembly 14 may include a piston crown 28 pivotally connected to a connecting rod 30, which is in turn pivotally connected to a crankshaft 32. Crankshaft 32 of internal combustion engine 10 may be rotatably disposed within engine block 12 and each piston assembly 14 coupled to crankshaft 32 so that a sliding motion of each piston assembly 14 within each cylinder 26 results in a rotation of crankshaft 32. Similarly, a rotation of the crankshaft 32 may result in a sliding motion of piston assemblies 14. As crankshaft 32 rotates 180 degrees, piston crown 28 and linked connecting rod 30 move through one full stroke between BDC and TDC. Internal combustion engine 10 may be a four stroke engine, wherein a complete cycle includes an intake stroke (TDC to BDC), a compression stroke (BDC to TDC), a power stroke (TDC to BDC), and an exhaust stroke (BDC to TDC). It is also contemplated that internal combustion engine 10 may alternately be a two stroke engine, wherein a complete cycle includes a compression/exhaust stroke (BDC to TDC) and a power/exhaust/intake stroke (TDC to BDC).

Figure 2:
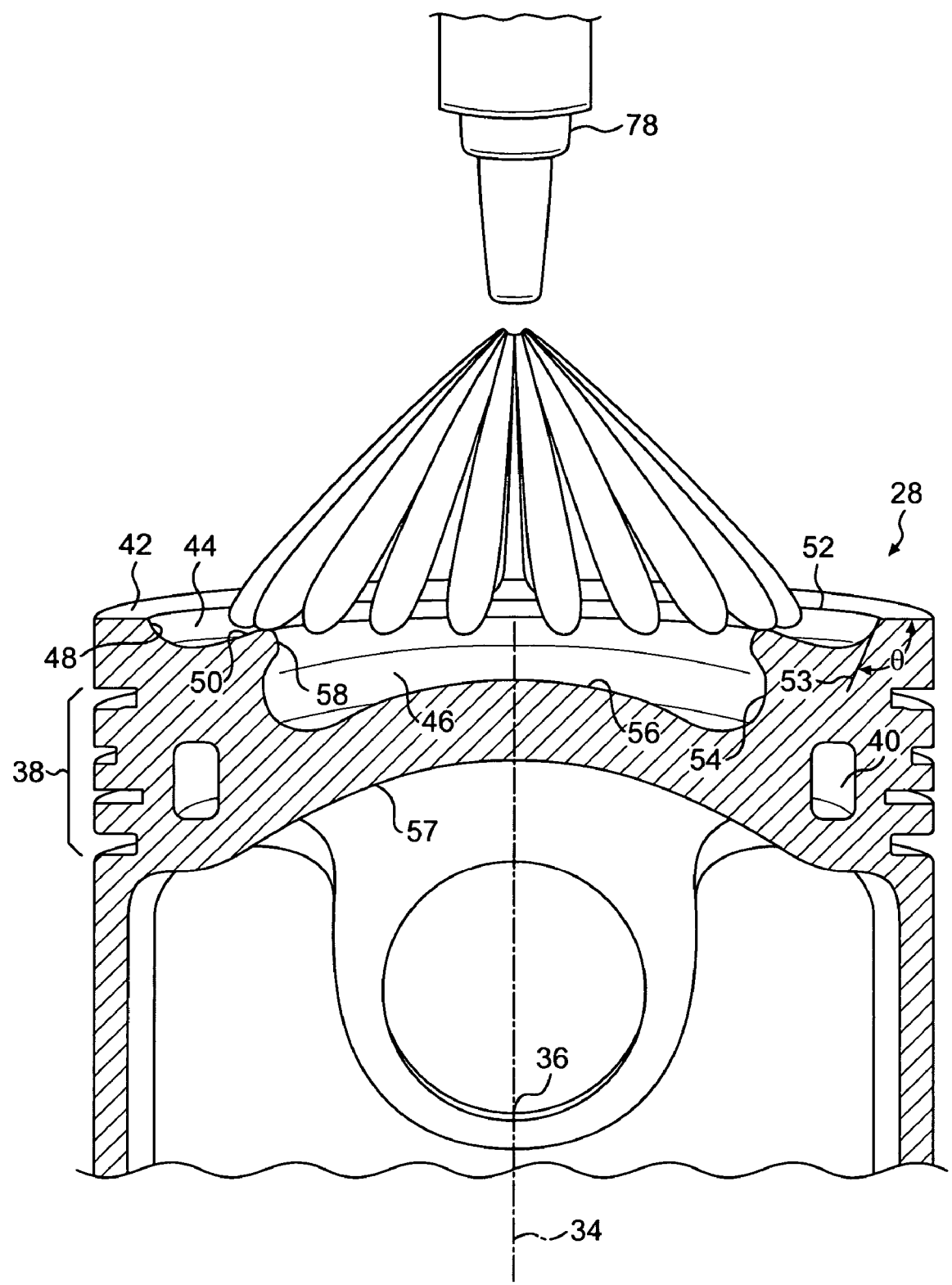
FIG. 2 is a cross-sectional diagrammatic illustration of an exemplary disclosed piston crown for the internal combustion engine of FIG. 1.

As illustrated in FIG. 2, piston crown 28 may have a generally cylindrical structure with a longitudinal axis 34, and may include a pivot bearing support 36, one or more ring grooves 38, a cooling passageway 40, and a face 42. Pivot bearing support 36 may be generally tubular, disposed transversely relative to longitudinal axis 34, and configured to receive a bearing (not shown) for rotatably supporting a wrist pin (not shown) that connects piston crown 28 to connecting rod 30. Ring grooves 38 may include annular grooves cut into an outer curved surface of piston crown 28 and may be configured to receive oil rings, compression rings, or any other type of piston rings known in the art. Cooling passageway 40 may include an annular passageway configured to facilitate circulation of a cooling medium such as, for example, engine oil. The circulation of engine oil through cooling passageway 40 during operation of internal combustion engine 10 may reduce a temperature of piston crown 28. Face 42 may be a curved or planar piston surface against which the combustion gases exert pressure. Face 42 may provide access to a first piston bowl 44 and a second piston bowl 46.

First piston bowl 44 may be a generally annular concave recess radially aligned with longitudinal axis 34. Specifically, first piston bowl 44 may include an outer curved wall 48 and a curved bottom surface 50. Outer curved wall 48 may be a curved surface that intersects face 42 at an interior annular edge 52. A line 53 that extends from interior annular edge 52 and is tangent to outer curved wall 48 forms an interior angle θ with face 42 that is greater than 90 degrees. It is contemplated that interior annular edge 52 may be rounded to minimize stress concentration. The greatest diameter of first piston bowl 44 may be located along interior annular edge 52, at the surface of face 42. The greatest diameter of first piston bowl 44 may be greater than a diameter of cooling passageway 40 to promote cooling of first piston bowl 44. First piston bowl 44 may be located along longitudinal axis 34 between cooling passageway 40 and face 42. Outer curved wall 48 and curved bottom surface 50 may be configured such that when an injection of fuel is directed into first piston bowl 44, the injected fuel first contacts curved bottom surface 50 and then flows toward outer curved wall 48 for redirection radially outward and upward away from curved bottom surface 50 toward face 42.

Second piston bowl 46 may be a generally symmetric recess disposed within curved bottom surface 50 of first piston bowl 44 and radially aligned with longitudinal axis 34. Second piston bowl 46 may include a concave annular outer wall 54 and a central convex bottom surface 56. The greatest diameter of second piston bowl 46 may be less than a diameter of cooling passageway 40 to ensure adequate structural integrity of piston crown 28. Second piston bowl 46 may be located along longitudinal axis 34 between cooling passageway 40 and first piston bowl 44, with a portion of convex bottom surface 56 farthest from face 42 being substantially co-planar with a surface of cooling passageway 40 that is closest to face 42. It is contemplated that the portion of convex bottom surface 56 farthest from face 42 may alternately be located along a plane that is not in substantial alignment with the surface of cooling passageway 40 that is closest to face 42. Annular outer wall 54 and convex bottom surface 56 may be configured such that when an injection of fuel is directed into second piston bowl 46, the injected fuel first contacts annular outer wall 54 and then flows toward convex bottom surface 56 for redirection radially inward and upward away from convex bottom surface 56 toward face 42. Convex bottom surface 56 may have a contour that is substantially identical to an inner lower surface 57 of piston crown 26 to facilitate stress distribution within piston crown 26.

Annular outer wall 54 of second piston bowl 46 may intersect curved bottom surface 50 of first piston bowl 44 at an annular protruding portion 58. Annular protruding portion 58 may extend away from curved bottom surface 50 toward face 42 and may be nearly co-planar with face 42. It is contemplated that protruding portion 58 may alternately extend to a point lower than face 42 that is not co-planar with face 42, and may extend directly inward rather than upward. The diameter of an opening within protruding portion 58 may be smaller than the greatest diameter of second piston bowl 46 to promote radial inward redirection of fuel that is injected into second piston bowl 46. The intersection of annular outer wall 54 and curved bottom surface 50 may be rounded to minimize stress concentration.

All of the surfaces of first piston bowl 44, second piston bowl 46, and protruding portion 58 may have curvature. In particular, the curved nature of the surfaces may promote controlled swirl and hinder uncontrolled splash of fuel injected into first and second piston bowls 44 and 46. It is contemplated that a portion of curved bottom surface 50 and/or convex bottom surface 56 may alternately be planar to facilitate manufacture.

Referring to FIG. 1, each cylinder head 16 may be associated with one cylinder 26 to form a combustion chamber 60 having one or more ports. Specifically, cylinder head 16 may define an intake passageway 62 that leads to an intake port 64 for each cylinder 26. Cylinder head 16 may further define at least one exhaust passageway 66 that leads to an exhaust port 68 for each cylinder 26. It is contemplated that one cylinder head 16 may alternately be associated with multiple cylinders 26 and piston assemblies 14 to form multiple combustion chambers. It is also contemplated that cylinder head 16 may further define two or more intake ports 64 and/or exhaust ports 68 for each cylinder 26.

Valve actuation system 18 may include an intake valve 70 disposed within each intake port 64. Each intake valve 70 may include a valve element that is configured to selectively block the respective intake port 64. Each intake valve 70 may be actuated to move or "lift" the valve element to thereby open the respective intake port 64. In a cylinder 26 having a pair of intake ports 64 and a pair of intake valves 70, the pair of intake valves 70 may be actuated by a single valve actuator (not shown) or by a pair of valve actuators (not shown).

An exhaust valve 72 may be disposed within each exhaust port 68. Each exhaust valve 72 may include a valve element that is configured to selectively block the respective exhaust port 68. Each exhaust valve 72 may be actuated to move or "lift" the valve element to thereby open the respective exhaust port 68. In a cylinder 26 having a pair of exhaust ports 68 and a pair of exhaust valves 72, the pair of exhaust valves 72 may be actuated by a single valve actuator (not shown) or by a pair of valve actuators (not shown).

Air induction system 20 may be configured to draw air into internal combustion engine 10 and may include an intake manifold 74 fluidly connected with intake passageway 62. It is contemplated that air induction system 20 may be a charged air system having a turbine-driven or engine-driven compressor (not shown), or may include additional air handling components such as, for example, a waste gate, a throttle valve, an EGR system, an air cleaner, an air cooler, or any other air handling component known in the art.

Fuel system 22 may be configured to supply fuel to internal combustion engine 10 and may include a source of pressurized fuel 76 and at least one fuel injector 78. It is contemplated that additional components may be included such as for example, a valve, a common fuel rail configured to distribute fuel to multiple fuel injectors, a pre-combustion chamber, or any other fuel system component known in the art.

Source of pressurized fuel 76 may be configured to produce a flow of pressurized fluid and may include a pump such as, for example, a variable displacement pump, a fixed displacement pump, a variable flow pump, or any other source of pressurized fluid known in the art. Source of pressurized fuel 76 may be drivably connected to the power source (not shown) by, for example, a countershaft (not shown), a belt (not shown), an electrical circuit (not shown), or in any other suitable manner. It is also contemplated that source of pressurized fuel 76 may alternately be a supply of pressurized gaseous fuel.

Each of fuel injectors 78 may be disposed within cylinder head 16 associated with each cylinder 26. Each fuel injector 78 may be operable to inject an amount of pressurized fuel into combustion chamber 60 at predetermined fuel pressures and fuel flow rates. Each fuel injector 78 may be mechanically, electrically, pneumatically, or hydraulically operated.

Exhaust system 24 may be configured to direct exhaust from cylinder 26 to the atmosphere and may include an exhaust manifold 80 in fluid communication with exhaust passageway 66 associated with each cylinder 26. It is contemplated that exhaust system 24 may include other components such as, for example, a turbine, an exhaust gas recirculation system, a particulate filter, a catalytic after-treatment system, or any other exhaust system component known in the art.

INDUSTRIAL APPLICABILITY

The disclosed combustion control system may be applicable to any internal combustion engine where swirling and mixing of injected fuel is important. The operation of internal combustion engine 10 will now be explained.

During an intake stroke of internal combustion engine 10, as piston assembly 14 is moving within cylinder 26 between the TDC position and the BDC position, intake valve 70 may be in the open position, as shown in FIG. 1. During the intake stroke, the downward movement of piston assembly 14 toward the BDC position may create a low pressure within cylinder 26. The low pressure may act to draw air from intake passageway 62 into cylinder 26 via intake port 64. As described above, a turbocharger may alternately be used to force compressed air into cylinder 26.

Following the intake stroke, both intake valve 70 and exhaust valve 72 may be in a closed position where the air is blocked from exiting cylinder 26 during the upward compression stroke of piston assembly 14. As piston assembly 14 moves upward from the BDC position toward the TDC position during the compression stroke, fuel may be injected into cylinder 26 for mixing and compression with air within cylinder 26. It is contemplated that the fuel may be injected into cylinder 26 at any time during the compression stroke, during a portion of the intake stroke when operating as a Homogeneous Charge Compression Ignition engine, or at multiple times during both the intake and compression strokes when operating as a Mixed Mode Injection engine. In one example, piston crown 28 may be effectively implemented to improve swirling and mixing during engine operation where the fuel is injected during the compression stroke, when crankshaft 32 is rotated to an angle between 120 degrees and 40 degrees before TDC.

As the fuel is injected into cylinder 26, a spray of fuel may be directed against the surfaces of first and second piston bowls 44 and 46. In particular, the fuel that is directed into first piston bowl 44 may first strike against curved bottom surface 50 and flow around curved bottom surface 50 toward outer curved wall 48 to be redirected radially outward and upward away from curved bottom surface 50 toward face 42. Because angle $\theta$ is greater than 90 degrees, redirection of the fuel upward away from curved bottom surface 50 and into the space within cylinder 26 above face 42 of piston crown 28 may be unhindered. The fuel that is directed into second piston bowl 46 may first strike annular outer wall 54 and flow around annular outer wall 54 toward convex bottom surface 56 to be redirected upward and radially inward toward a longitudinal axis 34 of piston crown 28. The curved nature of the first and second piston bowl surfaces may promote controlled swirling of the fuel while minimizing uncontrolled splash. Because the fuel spraying into first piston bowl 44 is directed radially outward and upward relative to piston crown 28 and the fuel spraying into second piston bowl 46 is directed upward and radially inward, a greater portion of the space above piston crown 28 may be used for mixing than if the fuel were only directed in one radial direction, just inward or just outward.

It will be apparent to those skilled in the art that various modifications and variations can be made to the disclosed internal combustion engine and piston. Other embodiments will be apparent to those skilled in the art from consideration of the specification and practice of the disclosed internal combustion engine and piston. It is intended that the specification and examples be considered as exemplary only, with a true scope being indicated by the following claims and their equivalents.

What is claimed is:

1. A piston for an internal combustion engine, comprising:
   a piston crown having a face with an interior annular edge;
   a first piston bowl recessed within the face of the piston crown, the first piston bowl having a single bottom surface and an outer wall, a line extending from the interior annular edge of the face and tangent with the outer wall forming an interior angle with the face of the piston crown greater than 90 degrees;
   a second piston bowl centrally disposed, recessed within the single bottom surface of the first piston bowl, and having an upper edge located below the face of the piston crown, an annular concave portion, and a central convex portion; and
   a wall portion disposed between the first and second piston bowls that protrudes upward relative to the single bottom surface and radially inward.

2. The piston of claim 1, wherein the greatest diameter of the second piston bowl is greater than a diameter of an opening within the wall portion.

3. The piston of claim 1, wherein the first piston bowl includes an annular concave portion.

4. The piston of claim 1, wherein every surface of the first and second piston bowls has curvature.

5. The piston of claim 1, wherein the interior annular edge is rounded and joins the face of the piston crown and the first piston bowl.

6. The piston of claim 1, further including an internal annular cooling passageway radially disposed between the greatest diameters of the first and second piston bowls.

7. The piston of claim 1, wherein the piston crown, first piston bowl, and second piston bowl are radially aligned along a common axis.

8. A piston for an internal combustion engine, comprising:
a piston crown having a face;
a first piston bowl recessed within the face of the piston crown, the first piston bowl having a bottom surface and the greatest diameter at the face of the piston crown;
a second piston bowl centrally located and having an upper edge located below the face of the piston crown; and
an internal annular cooling passageway entirely disposed radially outward of the greatest diameter of the second piston bowl.

9. The piston of claim 8, wherein the second piston bowl is recessed within the bottom surface of the first piston bowl.

10. The piston of claim 8, wherein a mouth of the second piston bowl has a smaller diameter than the greatest diameter of the second piston bowl.

11. The piston of claim 8, wherein the second piston bowl includes an annular portion and a central portion, the annular portion having a greater depth than the central portion.

12. The piston of claim 8, wherein the first piston bowl includes an outer annular concave portion and an inner annular concave portion.

13. The piston of claim 8, wherein every surface of the first and second piston bowls has curvature.

14. The piston of claim 8, wherein the piston crown, first piston bowl, and second piston bowl are radially aligned along a common axis.

15. A piston for an internal combustion engine, comprising:
a piston crown having a face;
a first piston bowl having a bottom surface and being recessed within the face of the piston crown;
a second piston bowl centrally located and having an upper edge located below the face of the piston crown; and
an internal annular cooling passageway having the greatest diameter greater than the greatest diameter of the second piston bowl and less than the greatest diameter of the first piston bowl.

16. The piston of claim 15, wherein the second piston bowl is recessed within the bottom surface of the first piston bowl.

17. The piston of claim 16, further including a curved protrusion joining the bottom surface of the first piston bowl and an outer surface of the second piston bowl.

18. The piston of claim 15, wherein an inner diameter of the curved protrusion is smaller than the greatest diameter of the second piston bowl.

19. The piston of claim 15, wherein the internal annular cooling passageway has an upper portion substantially coplanar with a bottom surface of the second piston bowl.

20. The piston of claim 15, wherein the second piston bowl has a bottom surface, the piston crown has a bottom interior surface, and the contour of the bottom surface of the second piston bowl substantially matches the contour of the bottom interior surface of the piston crown.

21. The piston of claim 15, wherein the first and second piston bowls each include annular concave portions.

22. The piston of claim 15, wherein every surface of the first and second piston bowls has curvature.

23. The piston of claim 15, wherein an outer curved wall of the first piston bowl intersects with the face of the piston crown.

24. The piston of claim 15, wherein the piston crown, first piston bowl, and second piston bowl are radially aligned along a common axis.

25. A method of operating an internal combustion engine having at least one cylinder and a piston slidably disposed within the at least one cylinder, the method comprising:
moving the piston toward a top dead center position during a compression stroke;
injecting fuel into a first piston bowl recessed within a face of the piston, the first piston bowl having a single bottom surface and an outer annular wall, a line extending from an interior annular edge of the face of the piston and tangent with the outer annular wall forming an interior angle greater than 90 degrees with the face of the piston;
injecting fuel against a bottom curved surface of a protrusion of a second piston bowl that extends upward relative to the single bottom surface of the first piston bowl, wherein the second piston bowl is centrally located and the upwardly extending protrusion is located below the face of the piston crown; and
directing a cooling medium through the piston.

26. The method of claim 25, wherein the second piston bowl is recessed within the single bottom surface of the first piston bowl.

27. The method of claim 25, wherein injecting fuel in the first and second piston bowls occurs when a crankshaft of the engine is between 40 and 120 degrees before top-dead-center.

28. The method of claim 25, wherein an injection of fuel into the first piston bowl first contacts the single bottom surface of the first piston bowl and then the outer annular wall of the first piston bowl.

29. The method of claim 28, wherein the single bottom surface and outer annular wall of the first piston bowl are configured to redirect the injection of fuel radially outward and upward toward the face of the piston.

30. The method of claim 25, wherein an injection of fuel into the second piston bowl contacts a bottom surface of the second piston bowl after contacting the bottom curved surface of the protrusion.

31. The method of claim 30, wherein the bottom surface and the protrusion of the second piston bowl are configured to redirect the injection of fuel radially inward and upward toward the face of the piston.

32. An internal combustion engine, comprising:
an engine block defining a plurality of cylinders; and
a piston crown disposed within each of the plurality of cylinders and having:
a face having an interior annular edge;
a first piston bowl recessed within the face of the piston crown, the first piston bowl having a single bottom surface and an outer wall, a line extending from the interior annular edge of the face and tangent with the outer wall forming an interior angle with the face of the piston crown greater than 90 degrees; and
a second piston bowl recessed within the single bottom surface of the first piston bowl, and having an annular concave portion, a central convex portion, and an annular wall portion disposed between the first and second piston bowls and protruding upward relative to the single bottom surface of the first piston bowl, wherein the contour of the concave and convex portions of the second piston bowl substantially match the contour of a bottom interior surface of the piston crown.

33. The internal combustion engine of claim 32, wherein the greatest diameter of the second piston bowl is greater than a diameter of an opening within the annular wall portion.

34. The internal combustion engine of claim 32, wherein the annular concave portion has a greater depth than the central convex portion.

35. The internal combustion engine of claim 32, wherein the first piston bowl includes an annular concave portion.

36. The internal combustion engine of claim 32, wherein every surface of the first and second piston bowls has curvature.

37. The internal combustion engine of claim 32, wherein the piston crown, first piston bowl, and second piston bowl are radially aligned along a common axis.

38. The internal combustion engine of claim 32, wherein the greatest diameter of the first piston bowl is at the face of the piston crown.

39. The internal combustion engine of claim 32, further including an internal annular cooling passageway having a diameter greater than the greatest diameter of the second piston bowl and less than the greatest diameter of the first piston bowl.

40. The internal combustion engine of claim 39, wherein the internal annular cooling passageway has an upper portion substantially co-planar with a bottom surface of the second piston bowl.

41. A piston for an internal combustion engine, comprising:
a piston crown having a face;
a first piston bowl recessed within the face of the piston crown, the first piston bowl having a bottom surface and an outer wall; and
a second piston bowl recessed within the bottom surface of the first piston bowl,
wherein every surface of the first and second piston bowls has curvature.

42. A piston for an internal combustion engine, comprising:
a piston crown having a face with an interior annular edge;
a first piston bowl recessed within the face of the piston crown, the first piston bowl having a bottom surface and an outer wall, a line extending from the interior annular edge of the face and tangent with the outer wall forming an interior angle with the face of the piston crown greater than 90 degrees; and
a second piston bowl centrally disposed and having an upper edge located below the face of the piston crown,
wherein the interior annular edge is rounded and joins the face of the piston crown and the first piston bowl.

43. A piston for an internal combustion engine, comprising:
a piston crown having a face;
a first piston bowl recessed within the face of the piston crown, the first piston bowl having a bottom surface and an outer wall;
a second piston bowl recessed within the bottom surface of the first piston bowl; and
an internal annular cooling passageway having an upper portion substantially co-planar with a bottom surface of the second piston bowl.

44. A piston for an internal combustion engine, comprising:
a piston crown having a face;
a first piston bowl recessed within the face of the piston crown, the first piston bowl having a bottom surface and an outer wall; and
a second piston bowl having an annular concave portion, a central convex portion, and an annular wall portion disposed between the first and second piston bowls and protruding upward relative to the single bottom surface of the first piston bowl, wherein the contour of the concave and convex portions of the second piston bowl substantially match the contour of a bottom interior surface of the piston crown.

* * * * *